Feb. 6, 1951 R. E. W. HARRISON 2,540,391
INERTIA ACTUATED AUTOMATIC OILER
Filed Dec. 21, 1949

INVENTOR.
Robert E. W. Harrison,
BY Victor J. Evans & Co.
ATTORNEYS

Patented Feb. 6, 1951

2,540,391

UNITED STATES PATENT OFFICE 2,540,391

INERTIA ACTUATED AUTOMATIC OILER

Robert Edward William Harrison,
Chambersburg, Pa.

Application December 21, 1949, Serial No. 134,274

4 Claims. (Cl. 184—26)

This invention relates to inertia or impulse actuated oiling devices of the type positioned on reciprocating or eccentrically actuating parts of machine tools or other machinery, and in particular a casing providing a lubricating fluid reservoir slidably mounted on a tubular stem forming a piston with valve means therein wherein the weight of the casing and fluid therein actuates a piston as an element on which the device is mounted travels whereby the piston forces a lubricating fluid to a journal or other part where lubrication is desired.

The purpose of this invention is to utilize the force of inertia or momentum of the moving part of a machine or the like for pumping a fluid through a lubricating system or device.

Various oiling and greasing devices have been provided with weights and other elements therein for forcing grease and lubricants into moving parts of machine tools, and the like but for some uses it has been found desirable to build up considerable pressure for forcing the lubricant through a lubricating system. With this thought in mind this invention contemplates an inertia actuated pumping device wherein the weight of the casing of a lubricant reservoir in combination with weight of a lubricant therein is utilized to provide the driving force for operating a piston in a cylinder by which lubricant from the reservoir is pumped to journals or other moving parts or into a lubricating system.

The object of this invention is, therefore, to provide means for constructing a lubricant pumping device whereby with the device mounted on a reciprocating or eccentrically traveling part of a machine tool or machine the weight of a lubricant storage chamber in combination with the weight of a lubricant therein is utilized for pumping the lubricant.

Another object of the invention is to provide an inertia actuated lubricant pumping device that operates automatically with the motion of the part of the machine or the like and that may be installed on machines now in use.

A further object of the invention is to provide an inertia actuated automatically operating lubricant pump that is actuated by an element upon which it is mounted which is of a simple and economical construction.

With these and other objects and advantages in view the invention embodies a casing providing a lubricant reservoir slidably mounted on a tubular stem with a piston carried by the reservoir extended into a cylindrical opening in the stem with a check valve in the lower end of the stem and with a connection extended from the stem whereby lubricant may be carried to a journal or the like.

Other features and advantages of the invention will appear from the following description taken in connection with the drawings wherein.

Figures 1, 2:
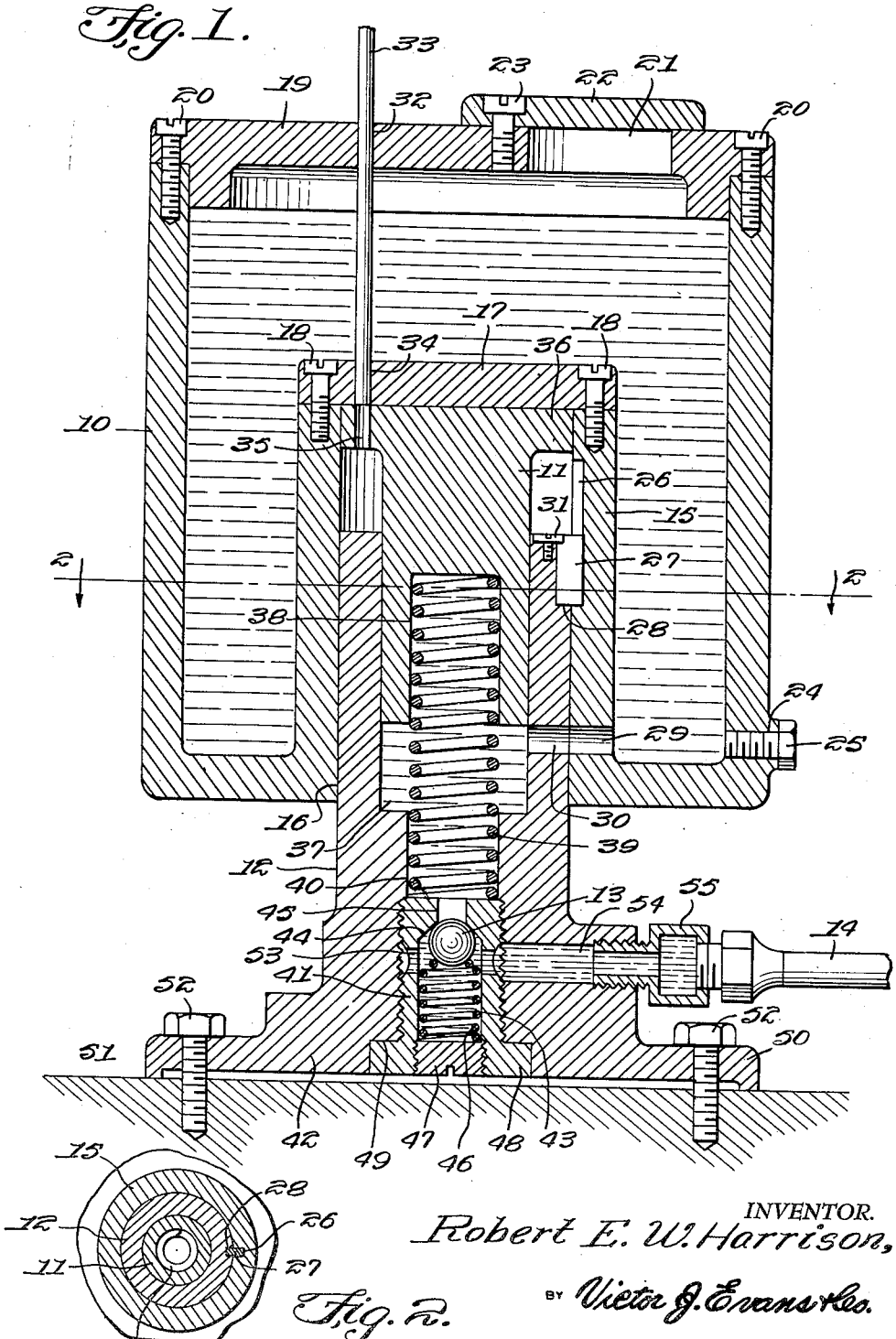
Figure 1 is a vertical section through the lubricating device.
Figure 2 is a sectional plan taken on line 2—2 of Figure 1 on a reduced scale illustrating the tubular mounting elements of the device.

Referring now to the drawings wherein like reference characters denote corresponding parts the improved inertia actuated lubricating device of this invention includes a casing 10 providing a reservoir, an inner piston 11, a tubular stem 12 providing a cylinder, a ball check valve 13 and an outlet connection 14.

The casing 10 is provided with a tubular inner section 15 having a cylindrical bore 16 and, as illustrated in Figure 1, the bore fits snugly over the stem 12 so that the casing is free to slide upwardly and downwardly on the stem. The inner part 15 is provided with a closure plate 17 that is secured to the section 15 by bolts 18 and the outer end of the casing 10 is provided with a cover plate 19 that is secured to the casing by bolts or screws 20. The cover plate 19 is provided with an opening 21 and this opening is closed by a plate 22 that is secured in position by a screw 23. The lower end of the casing 10 is provided with a drain connection 24 and a cap screw 25 is threaded in this opening.

The inner section 15 of the casing 10 is provided with a keyway 26 and a key 27 which is positioned in a notch 28 in the stem 12 extends into the keyway to retain the reservoir casing 10 in position on the stem 12 so that an opening 29 through the inner section 15 of the casing registers with an opening 30 in the wall of the stem 12. The key 27 is secured in position by a screw 31 which is threaded into the upper end of the stem 12 and the screw is provided with a head that extends into a notch in the key 27 to hold the key in the slot 28.

The cover 19 of the casing 10 is also provided with an opening 32 through which a vent tube 33 extends and the vent tube also extends through an opening 34 in the cover 17 and provides communicating means with an opening 35 that extends through the head 36 of the piston 11.

The stem 12 is provided with a cylindrical bore 37 into which the opening 30 opens and the piston 11 is positioned to travel in this bore. The inner end of the piston 11 is provided with a bore 38 in which one end of a spring 39 extends and the opposite end of the spring is positioned in a bore 40 of the stem 12.

A plug 41 is threaded into the base 42 of the stem 12 and the plug is provided with a bore 43 having a valve seat 44 at the inner end and an opening 45 extends from the valve seat to the cylinder 37 through the opening 40. The ball check valve 13 is resiliently held against the seat 44 by a spring 46 and the spring is held in position by a nut 47 threaded in the outer end of the plug 41. The plug 41 is provided with a head 48 that is positioned in a recess 49 in the base 42 of the stem 12.

In the design shown the base 42 of the stem is provided with a flange 50 by which the lubricating device may be attached to a moving part 51 of a machine tool, machine or the like, by bolts 52.

The plug 41 is provided with an outlet opening 53 that communicates with an opening 54 through the base of the stem 12, and a coupling 55 is threaded in the outer end of the opening 54 whereby the outlet connection 14 is secured to the outlet of the device through the base of the stem 12.

With the parts arranged in this manner reciprocating motion of the element 51 throws the casing 10 with the lubricant reservoir therein outwardly as the elements travel in one direction, and inwardly as the elements travel in the opposite direction and as the casing moves inwardly the piston 11 drives oil or other lubricant in the cylinder 37 through the check valve 13 and into the outlet connection 14 through which the lubricant passes to a lubricating system or directly to journals, bearings, or other moving parts.

It will be understood that the inertia actuated lubricant pump may be mounted directly on a connecting rod or other moving part of a machine or device and the base of the stem 12 may be formed to correspond with the surface to which the device is attached.

It will be understood that other modifications may be made in the design and arrangement of the parts without departing from the spirit of the invention.

What is claimed is:

1. A lubricating pump comprising a stem having a cylinder therein, a casing having a lubricant storage chamber therein slidably mounted on the stem, a piston carried by the casing and positioned to travel in the cylinder of the stem, and an outlet connection having a check valve therein extended from the stem, said casing and stem having registering openings therein for supplying lubricant from the storage chamber to the cylinder in the stem.

2. A lubricating pump comprising a stem having a cylinder therein, a casing having a lubricant storage chamber therein slidably mounted on the stem, a piston carried by the casing and positioned to travel in the cylinder of the stem, an outlet connection having a check valve therein extended from the stem, said casing and stem having registering openings therein for supplying lubricant from the storage chamber to the cylinder in the stem, and means keying the casing to the stem for retaining the lubricant supplying openings in the casing and stem in registering relation.

3. A lubricating pump comprising a stem having a cylinder therein, a casing having a lubricant storage chamber therein slidably mounted on the stem, a piston carried by the casing and positioned to travel in the cylinder of the stem, an outlet connection having a check valve therein extended from the stem, said casing and stem having registering openings therein for supplying lubricant from the storage chamber to the cylinder in the stem, and a spring in the cylinder for retaining the casing having the lubricant storage chamber therein in an outwardly extended position.

4. In a lubricating pump for moving parts of machinery and the like, the combination which comprises a stem having a cylinder in the outer end thereof and having means on the opposite end for mounting the stem on a moving part of a machine or the like, a casing having a lubricant storage chamber therein slidably mounted on the stem, a piston carried by the casing and positioned to travel in the cylinder of the stem, a vent extended through the casing for relieving pressure in an area between the end of the stem and casing, a plug having a valve seat therein threaded in the lower end of the stem, a ball check valve positioned in said plug, an outlet connection extended from the stem and communicating with the cylinder in the stem through the ball check valve in the plug, and means resiliently urging the casing having a storage chamber therein outwardly.

ROBERT EDWARD WILLIAM HARRISON.

REFERENCES CITED

The following references are of record in the file of this patent:

UNITED STATES PATENTS

| Number | Name | Date |
| --- | --- | --- |
| 1,182,390 | Lewis | May 9, 1916 |
| 1,666,502 | Moore | Apr. 17, 1928 |
| 1,842,430 | Spohr | Jan. 26, 1932 |